United States Patent
Moratz

(10) Patent No.: US 9,528,554 B2
(45) Date of Patent: Dec. 27, 2016

(54) DOUBLE LIP AXIAL RADIAL BEARING SEAL

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/669,632

(22) Filed: Mar. 26, 2015

(65) Prior Publication Data

US 2015/0316102 A1    Nov. 5, 2015

Related U.S. Application Data

(60) Provisional application No. 61/987,169, filed on May 1, 2014.

(51) Int. Cl.
| | |
|---|---|
| F16C 33/76 | (2006.01) |
| F16C 33/78 | (2006.01) |
| F16J 15/32 | (2016.01) |
| F16C 19/06 | (2006.01) |

(52) U.S. Cl.
CPC ....... F16C 33/7853 (2013.01); F16C 33/7823 (2013.01); F16J 15/3216 (2013.01); F16J 15/3236 (2013.01); F16C 19/06 (2013.01)

(58) Field of Classification Search
CPC .............. F16C 33/7823; F16C 33/7836; F16C 33/7853; F16C 33/7856; F16J 15/3216; F16J 15/322; F16J 15/3236
USPC ........................................ 384/482, 484, 486
See application file for complete search history.

(56) References Cited

U.S. PATENT DOCUMENTS

| | | | | |
|---|---|---|---|---|
| 3,366,428 A | * | 1/1968 | Smith ................. | F16C 33/7836 277/362 |
| 3,396,977 A | * | 8/1968 | Iguchi ................. | F16C 33/7853 277/353 |
| 4,932,796 A | * | 6/1990 | Schurger ................. | F16C 19/10 384/482 |
| 5,199,798 A | * | 4/1993 | Porter ................. | F16C 33/6629 384/462 |
| 5,470,158 A | | 11/1995 | McLarty et al. | |

(Continued)

FOREIGN PATENT DOCUMENTS

| | | | | |
|---|---|---|---|---|
| FR | EP0976939 A1 | * | 2/2000 | ............ F16C 13/006 |
| WO | 2008138281 A1 | | 11/2008 | |

*Primary Examiner* — Phillip A Johnson
(74) *Attorney, Agent, or Firm* — Simpson & Simpson, PLLC

(57) ABSTRACT

A bearing assembly, including: an axis of rotation; an outer bearing ring; an inner bearing ring; and a seal. The seal includes: an annular-shaped body made of a flexible material and including a radially outermost segment in contact with the outer bearing ring and sealed against the outer bearing ring, a radially innermost segment in contact with a first portion of the inner bearing ring and sealed against the first portion of the inner bearing ring and a lip segment. The lip segment extends from the body in a first axial direction parallel to the axis of rotation, is located between the radially outermost and innermost segments in a radial direction orthogonal to the axis of rotation, and, is in contact with and sealed against a second portion of the inner bearing ring. The seal includes a reinforcing brace at least partially embedded in the body.

20 Claims, 5 Drawing Sheets

(56) References Cited

U.S. PATENT DOCUMENTS

| | | | |
|---|---|---|---|
| 6,776,531 B2 * | 8/2004 | Tsuchida | F16C 33/7853 384/484 |
| 2006/0291761 A1 | 12/2006 | Gietl et al. | |
| 2008/0247696 A1 | 10/2008 | Winkelmann et al. | |
| 2011/0069918 A1 | 3/2011 | Wakuda et al. | |

* cited by examiner

DOUBLE LIP AXIAL RADIAL BEARING SEAL

CROSS-REFERENCE TO RELATED APPLICATIONS

This application claims the benefit under 35 U.S.C. §119(e) of U.S. Provisional Patent Application No. 61/987,169, filed May 1, 2014, which application is incorporated herein by reference in its entirety.

TECHNICAL FIELD

The present disclosure pertains to the field of seals, and, more particularly, to seals used with bearings, and, even more particularly, to seals used with bearings in high pressure fluid environments.

BACKGROUND

Seals are used with bearings to protect the bearings and other bearing components located in the interior of the bearing. Seals can be positioned on the outside of a particular bearing to prevent contamination from the external environment. One common bearing utilizing such seals are double ring bearings.

Typically, seals for bearings have an outer edge engaged with an outer bearing ring and an inner edge engaged with an inner bearing ring. The outer edge is located in a stepped groove of the outer bearing that has radially disposed sides and opens radially inward. The groove configuration provides a secure seal at the outer edge of the seal. However, to facilitate assembly of the seal to the bearing, the inner edge is engaged with a slot in the inner bearing ring open radially inward and in an axial direction, rather than a groove. The configuration of the inner bearing ring results in easier assembly of the bearing, but is less robust and leads to leaks around the inner edge of the seal. For example, in high pressure fluid situations, such as clean up processes in the food industry, high pressure streams may force water or other fluids past the inner edge of the seal leading to contamination of the bearing and subsequent deterioration of the bearing itself.

SUMMARY

According to aspects illustrated herein, there is provided a bearing assembly, including: an axis of rotation; an outer bearing ring; an inner bearing ring; and a seal. The seal includes: an annular-shaped body made of a flexible material and including a radially outermost segment in contact with the outer bearing ring and sealed against the outer bearing ring, a radially innermost segment in contact with a first portion of the inner bearing ring and sealed against the first portion of the inner bearing ring and a lip segment. The lip segment extends from the body in a first axial direction parallel to the axis of rotation, is located between the radially outermost and innermost segments in a radial direction orthogonal to the axis of rotation, and, is in contact with and sealed against a second portion of the inner bearing ring. The seal includes a reinforcing brace at least partially embedded in the body.

According to aspects illustrated herein, there is provided a bearing assembly, including: an axis of rotation; an outer bearing ring; an inner bearing ring including a radially outermost surface facing the outer bearing ring in a radial direction orthogonal to the axis of rotation and a first radially disposed surface co-planar with a first plane orthogonal to the axis of rotation; and a seal. The seal includes: an annular-shaped body made of a flexible material and including a radially outermost segment in contact with the outer bearing ring and sealed against the outer bearing ring and a radially innermost segment including a second radially disposed surface in contact with the first radially disposed surface and sealed against the first radially disposed surface; and a lip segment. The lip segment: extends from the body in a first axial direction parallel to the axis of rotation and includes a first surface in contact with the radially outermost surface of the inner bearing ring and sealed against the radially outermost surface of the inner bearing ring. The seal includes a reinforcing brace at least partially embedded in the body.

According to aspects illustrated herein, there is provided a seal for a bearing assembly, including: a longitudinal axis; an annular-shaped body made of a flexible material and including a radially outermost segment arranged to contact an outer bearing ring for the bearing assembly to seal against the outer bearing ring, a radially innermost segment arranged to contact a first portion of an inner bearing ring for the bearing assembly to seal against the first portion of the inner bearing ring, and a lip segment. The lip segment: extends from the body in a first axial direction parallel to the longitudinal axis, is located between the radially outermost and innermost segments in a radial direction orthogonal to the longitudinal axis, and includes a first surface substantially parallel to the longitudinal axis and arranged to contact a second portion of the inner bearing ring to seal against the second portion of the inner bearing ring. The seal includes a reinforcing brace at least partially embedded in the body.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical structural elements of the disclosure. It is to be understood that the invention as claimed is not limited to the disclosed aspects. It also should be appreciated that figure proportions and angles are not always to scale in order to clearly portray the attributes of the present disclosure.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1A:
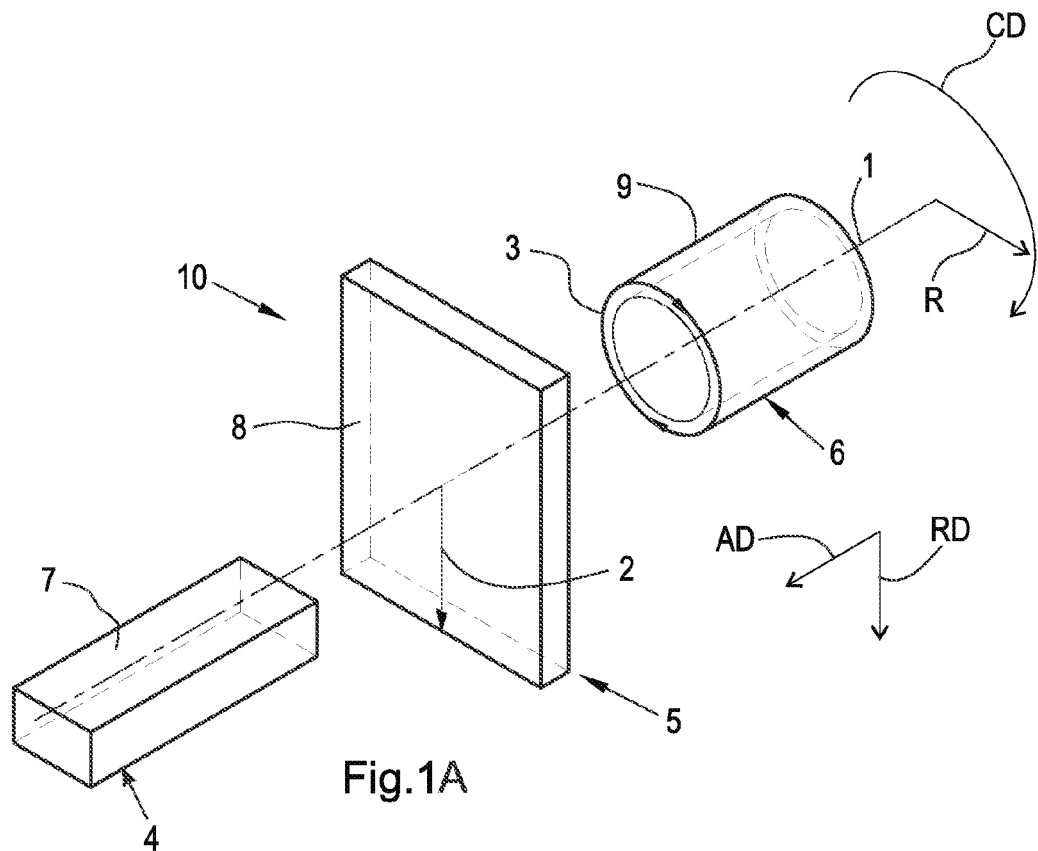
FIG. 1A is a perspective view of a cylindrical coordinate system demonstrating spatial terminology used in the present application.

FIG. 1A is a perspective view of cylindrical coordinate system 10 demonstrating spatial terminology used in the present application. The present invention is at least partially described within the context of cylindrical coordinate system 10. System 10 has a longitudinal axis 1, used as the reference for the directional and spatial terms that follow. Axial direction AD is parallel to axis 1. Radial direction RD is orthogonal to axis 1. Circumferential direction CD is defined by an endpoint of radius R (orthogonal to axis 1) rotated about axis 1.

To clarify the spatial terminology, objects 4, 5, and 6 are used. Surface 7 of object 4 forms an axial plane. For example, axis 1 is congruent with surface 7. Surface 8 of object 5 forms a radial plane. For example, radius 2 is congruent with surface 8. Surface 9 of object 6 forms a circumferential surface. For example, circumference 3 is congruent with surface 9. As a further example, axial movement or disposition is parallel to axis 1, radial movement or disposition is orthogonal to axis 1, and circumferential movement or disposition is parallel to circumference 3. Rotation is with respect to axis 1.

The adverbs "axially," "radially," and "circumferentially" are with respect to an orientation parallel to axis 1, radius 2, or circumference 3, respectively. The adverbs "axially," "radially," and "circumferentially" also are regarding orientation parallel to respective planes.

Figure 1B:
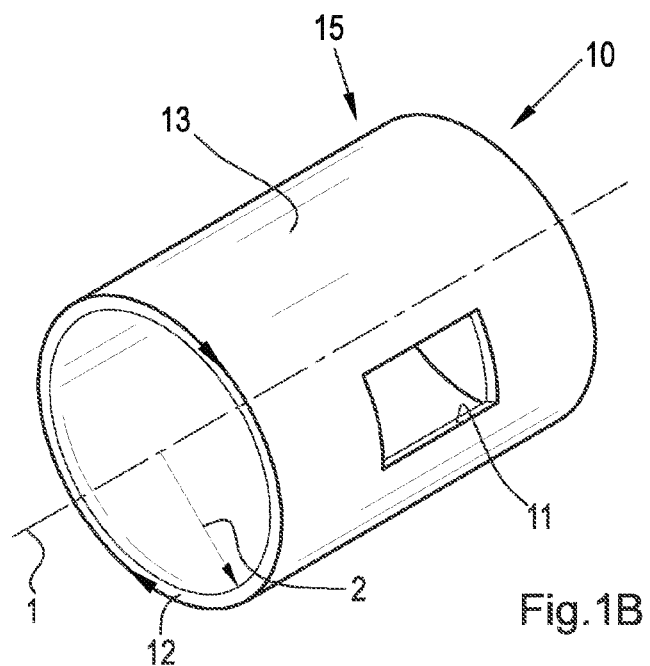
FIG. 1B is a perspective view of an object in the cylindrical coordinate system of FIG. 1A demonstrating spatial terminology used in the present application.

FIG. 1B is a perspective view of object 15 in cylindrical coordinate system 10 of FIG. 1A demonstrating spatial terminology used in the present application. Cylindrical object 15 is representative of a cylindrical object in a cylindrical coordinate system and is not intended to limit the present invention in any manner. Object 15 includes axial surface 11, radial surface 12, and circumferential surface 13. Surface 11 is part of an axial plane and surface 12 is part of a radial plane.

Figure 2:
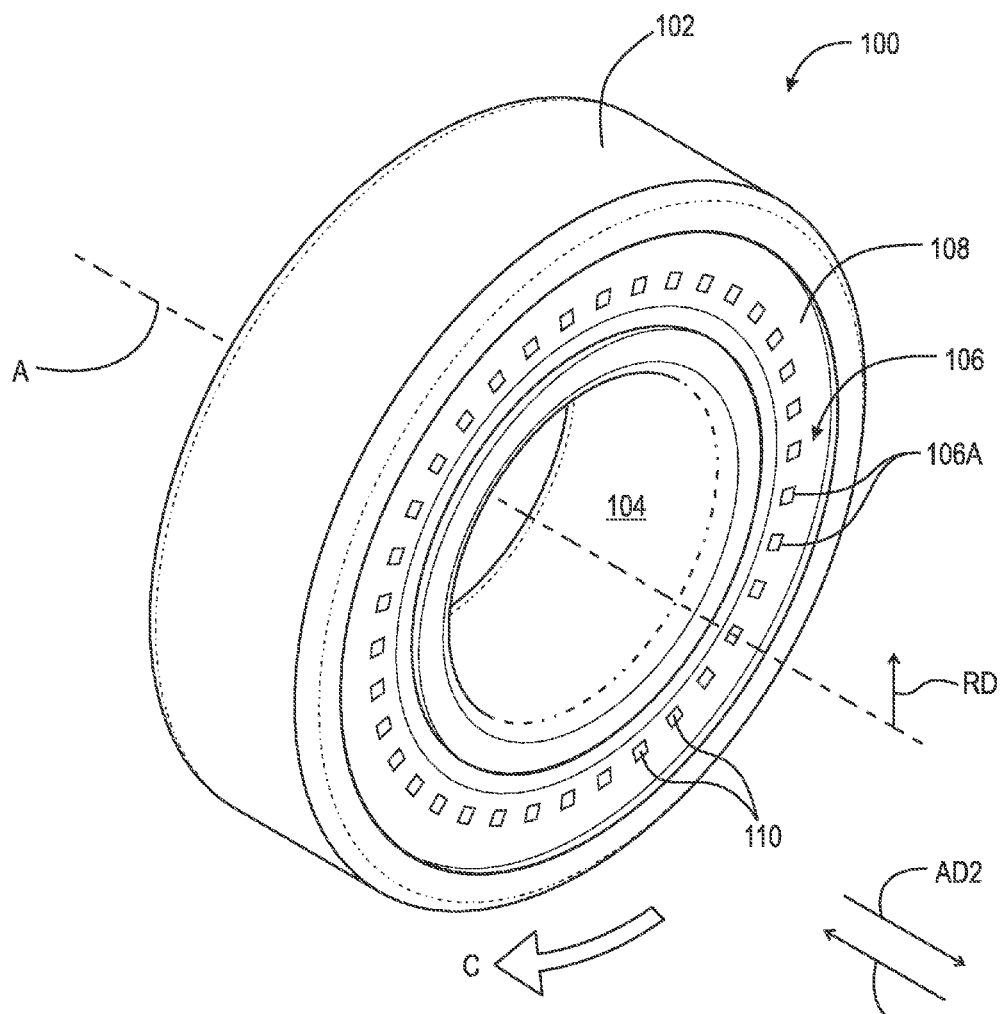
FIG. 2 is a top perspective view of a bearing/seal assembly.

FIG. 2 is a top perspective view of bearing assembly 100.

Figure 3:
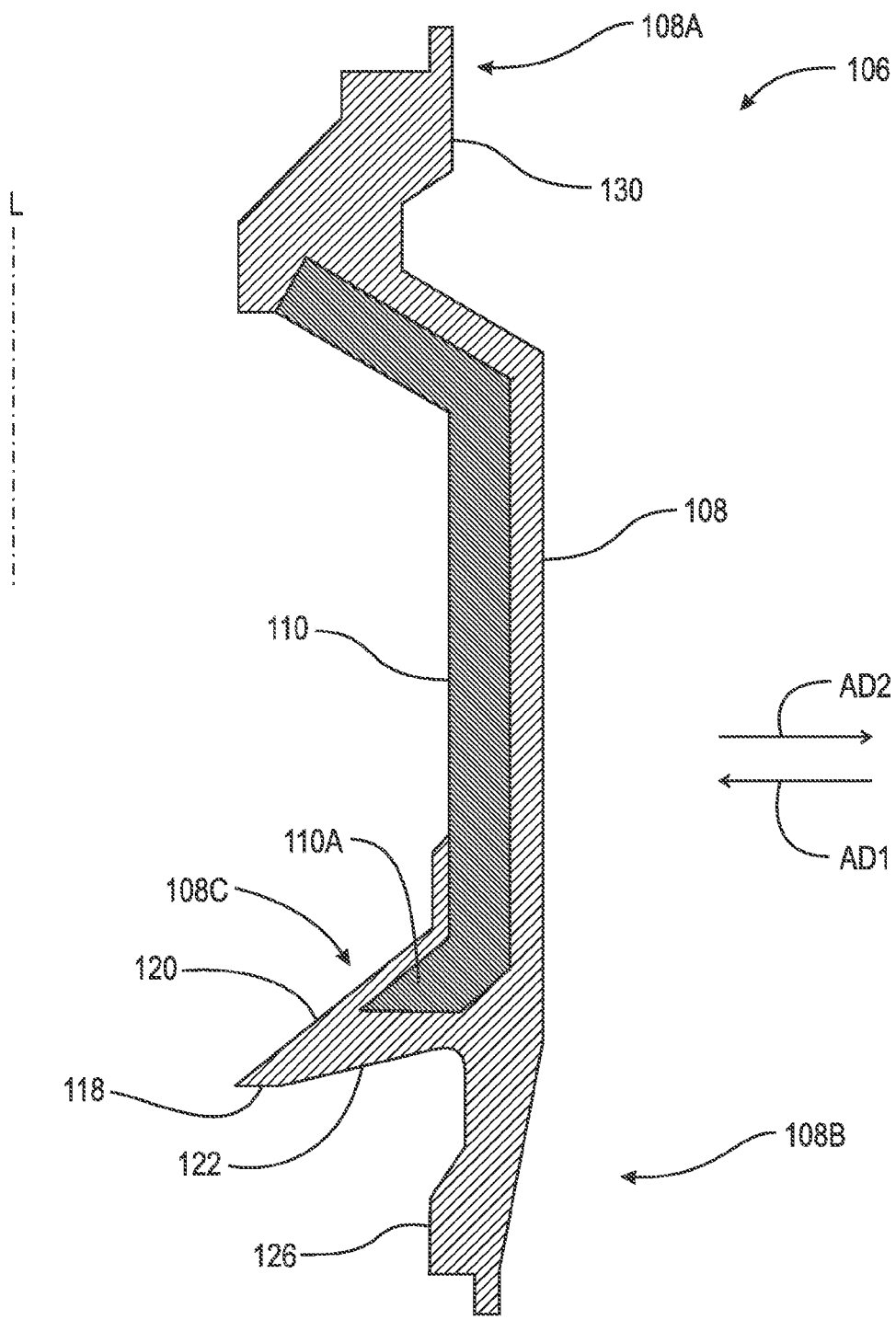
FIG. 3 is a cross-sectional view of the seal shown in FIG. 2.

FIG. 3 is a cross-sectional view of seal 106 shown in FIG. 2.

Figure 4:
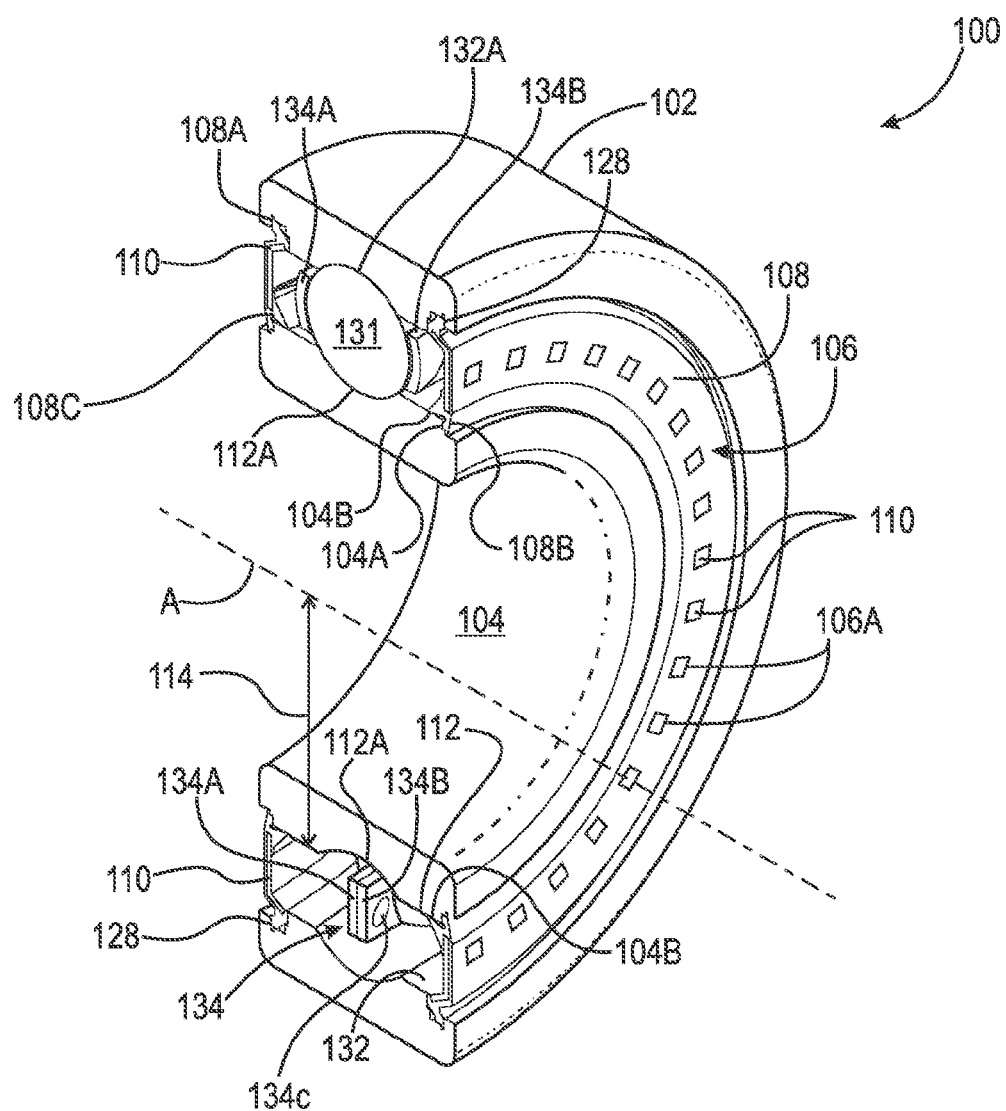
FIG. 4 is a cross-sectional view of the bearing/seal assembly shown in FIG. 2 depicting the arrangement of the seal in the interior of the assembly; and, FIG. 5 is an enlarged plan view of the upper cross-section shown in FIG. 4.

FIG. 4 is a cross-sectional view of bearing assembly 100 shown in FIG. 2 depicting the arrangement of seal 106 in the interior of the assembly.

Figure 5:
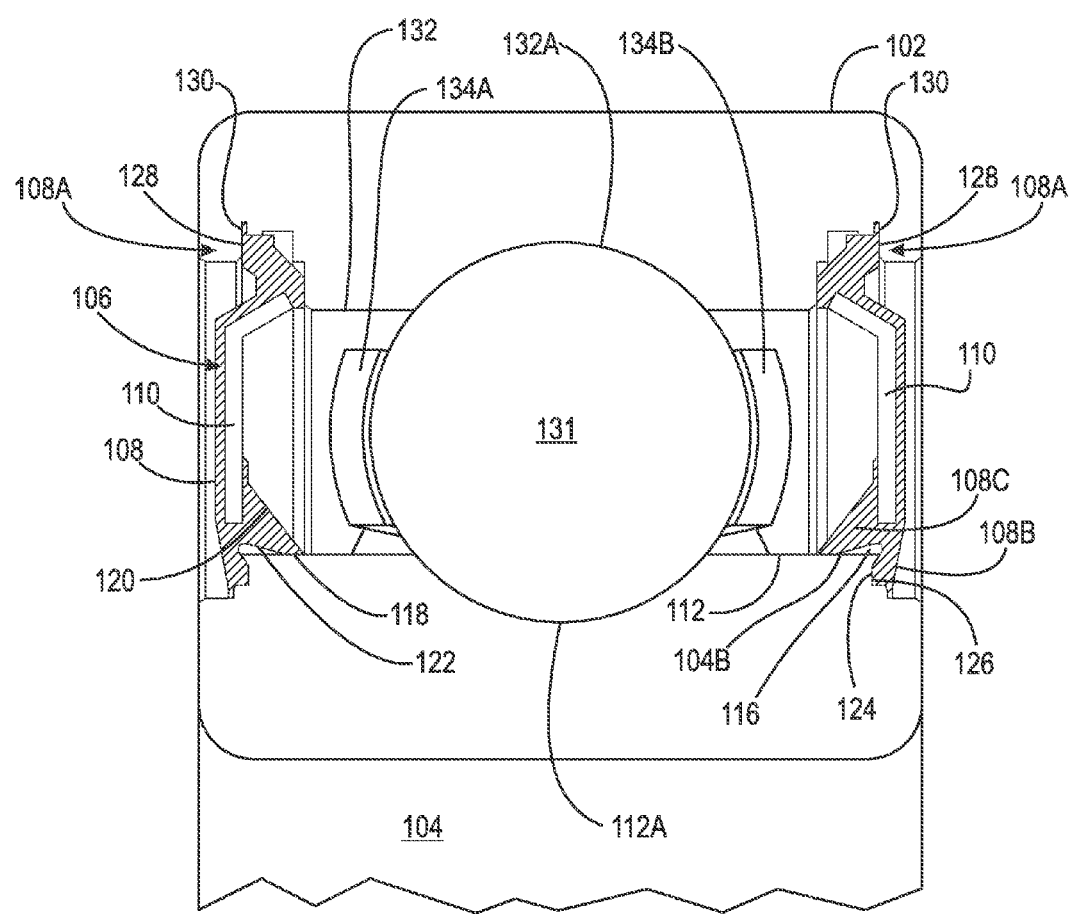

FIG. 5 is an enlarged elevational view of the upper cross section shown in FIG. 4. The following description should be appreciated in view of FIGS. 2-5. Bearing assembly 100 includes axis of rotation A, outer bearing ring 102, inner bearing ring 104, and seal 106. Seal 106 includes annular-shaped body 108 made of a flexible material. Body 108 includes: radially outermost segment 108A in contact with outer bearing ring 102 and sealed against outer bearing ring 102; radially innermost segment 108B in contact with portion 104A of inner bearing ring 104 and sealed against portion 104A; and lip segment 108C. Lip segment 108C: extends from body 108 in axial direction AD1 parallel to axis A; is located between segments 108A and 108B in radial direction RD orthogonal to axis A; and, is in contact with portion 104B of inner bearing ring 104. Seal 106 includes reinforcing brace 110 at least partially embedded in body 108.

Inner bearing ring 104 includes radially outermost surface 112 facing outer bearing ring 102. Surface 112 includes portion 104B. In an example embodiment, surface 112 is parallel to axis A and located uniform distance 114 from axis A in radial direction RD. In an example embodiment, enclosed space 116 is at least partially bounded by lip segment 108C, surface 112, and segment 108B. Lip segment 108C includes surface 118 in contact with surface 112 and sealed against surface 112. In an example embodiment, lip segment 108C includes surface 120 tapering, in axial direction AD1, opposite axial direction AD2, toward axis A between surface 118 and body 108. In an example embodiment, lip segment 108C includes surface 122 tapering, in axial direction AD1 toward axis A between surface 118 and body 108.

In an example embodiment, inner bearing ring 104 includes radially disposed surface 124 co-planar with a plane orthogonal to axis A, and segment 108B includes radially disposed surface 126 in contact with radially disposed surface 124 and sealed against radially disposed surface 124. In an example embodiment, radially disposed surface 124 is radially inward of lip segment 108C and at least a portion of lip segment 108C is located further in axial direction AD1 than radially disposed surface 124.

In an example embodiment, outer bearing ring 102 includes radially disposed surface 128 co-planar with another plane orthogonal to axis A and radially outermost segment 108A includes radially disposed surface 130 in contact with radially disposed surface 128 and sealed against radially disposed surface 128.

In an example embodiment, seal 106 defines a plurality of relief holes or windows 106A ("windows 106A") that help to maintain integrity of seal 106 during expansion and contraction of seal 106. Reinforcing brace 110 is visible through windows 106A.

Rolling element 131 is set in opposing middle grooves 132A and 112A in radially disposed surface 132 and radially disposed surface 112, respectively. Components 134A and 134B of bearing cage 134 act to retain rolling elements 131 in the grooves 132A and 112A and are joined by at least one rivet 134C. In an example embodiment, seal 106 extends in circumferential direction C around assembly 100 between outer ring 102 and inner ring 104.

In an example embodiment, assembly 100 includes seals 106 which are mirror images of each other. The term "mirror image" means the two articles look the same but its left and right sides reversed. In an example embodiment, brace 110 is shown with single angled component 110A.

In an example embodiment, seal 106 is made of any elastomer material known in the art, such as VITON® and forms a durable bond with brace 110. In an example embodiment, brace 110 is metal.

Advantageously, lip segment 108C solves the problem noted above regarding leakage around the inner edge of a bearing seal in a high pressure fluid environment. For example, surface 118 provides an additional seal between rolling elements 131 and an exterior environment and portion 108C provides extra bracing of seal 106 to maintain the sealing surfaces, such as surfaces 118, 126, and 130 of seal 106 in desired configurations. Thus, portion 108C compensates for the axially open configuration of portion 104A. That is, portion 104A enables a desired easier installation of seal 106 while portion 108C prevents leakage around portion 104A.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A bearing assembly arranged to rotate about an axis of rotation, comprising:
   an outer bearing ring;
   an inner bearing ring including a first portion including a first radially disposed surface, orthogonal to the axis of rotation; and,
   a seal including:
      an annular-shaped body made of a flexible material and including:
         a radially outermost segment in contact with the outer bearing ring;
         a radially innermost segment including a second radially disposed surface, in contact with the first radially disposed surface of the inner bearing ring; and,
         a lip segment:
            extending from the body in a first axial direction, parallel to the axis of rotation;
            located between the radially outermost and innermost segments in a radial direction, orthogonal to the axis of rotation; and,
            in contact with a second portion of the inner bearing ring; and,
         a reinforcing brace at least partially embedded in the body.

2. The bearing assembly recited in claim 1, wherein:
   the inner bearing ring includes a radially outermost surface facing the outer bearing ring; and,
   the radially outermost surface includes the second portion.

3. The bearing assembly recited in claim 2, wherein the radially outermost surface is parallel to the axis of rotation and located at a uniform distance from the axis of rotation in the radial direction.

4. The bearing assembly recited in claim 2, further comprising:
   an enclosed space at least partially bounded by the lip segment, the radially outermost surface, and the radially innermost segment.

5. The bearing assembly recited in claim 1, wherein:
   the inner bearing ring includes a radially outermost surface facing the outer bearing ring; and,
   the lip segment includes a first surface in contact with the radially outermost surface.

6. The bearing assembly recited in claim 5, wherein the lip segment includes:
   a second surface tapering, in a second axial direction, opposite the first axial direction, away from the axis of rotation between the first surface and the annular-shaped body; and,
   a third surface:
      radially inward of the second surface; and,
      tapering in the second axial direction away from the axis of rotation between the first surface and the annular-shaped body.

7. The bearing assembly recited in claim 1, wherein:
   the first radially disposed surface is co-planar with a first plane, orthogonal to the axis of rotation.

8. The bearing assembly recited in claim 7, wherein:
   the second radially disposed surface is radially inward of the lip segment; and,
   at least a portion of the lip segment is located further in the first axial direction than the second radially disposed surface.

9. The bearing assembly recited in claim 1, wherein:
   the outer bearing ring includes a first radially disposed surface co-planar with a first plane, orthogonal to the axis of rotation; and,
   the radially outermost segment includes a second radially disposed surface in contact with the first radially disposed surface.

10. A bearing assembly arranged to rotate about an axis of rotation, comprising:
    an outer bearing ring;
    an inner bearing ring including:
       a radially outermost surface facing the outer bearing ring in a radial direction, orthogonal to the axis of rotation; and,
       a first radially disposed surface, co-planar with a first plane, orthogonal to the axis of rotation;
    a seal including:
       an annular-shaped body made of a flexible material and including:
          a radially outermost segment in contact with the outer bearing ring;
          a radially innermost segment including a second radially disposed surface in contact with the first radially disposed surface; and,
          a lip segment:
             extending from the body in a first axial direction parallel to the axis of rotation; and,
             including a first surface in contact with the radially outermost surface of the inner bearing ring and sealed against the radially outermost surface of the inner bearing ring; and,
          a reinforcing brace at least partially embedded in the body.

11. The bearing assembly recited in claim 10, wherein the radially outermost surface is parallel to the axis of rotation and located at a uniform distance from the axis of rotation in the radial direction.

12. The bearing assembly recited in claim 10, further comprising:
    an enclosed space at least partially bounded by the lip segment, the radially outermost surface, and the radially innermost segment.

13. The bearing assembly recited in claim 10, wherein the lip segment includes:
    a second surface tapering, in a second axial direction, opposite the first axial direction, away from the axis of rotation, between the first surface and the annular-shaped body; and,
    a third surface:
       radially inward of the second surface; and,
       tapering in the second axial direction, away from the axis of rotation, between the first surface and the annular-shaped body.

14. The bearing assembly recited in claim 10, wherein:
the outer bearing ring includes a second radially disposed surface co-planar with a second plane, orthogonal to the axis of rotation; and,
the radially outermost segment includes a third radially disposed surface in contact with the second radially disposed surface.

15. A seal for a bearing assembly, comprising:
a longitudinal axis;
an annular-shaped body made of a flexible material and including:
  a radially outermost segment arranged to contact an outer bearing ring for the bearing assembly;
  a radially innermost segment including a first radially disposed surface arranged to contact a first radially disposed portion of an inner bearing ring for the bearing assembly; and,
  a lip segment:
    extending from the body in a first axial direction, orthogonal to the longitudinal axis;
    located between the radially outermost and innermost segments in a radial direction, parallel to the longitudinal axis; and,
    including a first surface:
      substantially orthogonal to the longitudinal axis; and,
      arranged to contact a second portion of the inner bearing ring; and,
  a reinforcing brace at least partially embedded in the body.

16. The seal recited in claim 15, further comprising:
a space at least partially bounded by the lip segment and a radially outermost surface of the inner bearing ring and opening away from the longitudinal axis in the axial direction.

17. The seal recited in claim 15, wherein the first surface:
terminates at a distal end of the lip segment; and,
is arranged to contact a radially outermost surface of the inner bearing ring.

18. The seal recited in claim 15, wherein the lip segment includes:
a second surface tapering, in a second axial direction, opposite the first axial direction, away from the longitudinal axis, from the first surface to the annular-shaped body; and,
a third surface:
  radially inward of the second surface; and,
  tapering in the second axial direction, away from the longitudinal axis, from the first surface to the annular-shaped body.

19. The seal recited in claim 15, wherein the radially disposed surface is co-planar with a plane, orthogonal to the longitudinal axis.

20. The seal recited in claim 15, wherein the radially outermost segment includes a radially disposed surface:
co-planar with a plane, parallel to the longitudinal axis; and,
arranged to contact with the outer bearing ring.

* * * * *